United States Patent
Pertuit, Jr.

(10) Patent No.: US 8,905,227 B2
(45) Date of Patent: Dec. 9, 2014

(54) CLEANABLE CONVEYOR BELT AND CARRYWAY

(71) Applicant: Laitram, L.L.C., Harahan, LA (US)

(72) Inventor: Wayne A. Pertuit, Jr., Westwego, LA (US)

(73) Assignee: Laitram, L.L.C., Harahan, LA (US)

( * ) Notice: Subject to any disclaimer, the term of this patent is extended or adjusted under 35 U.S.C. 154(b) by 38 days.

(21) Appl. No.: 13/771,613

(22) Filed: Feb. 20, 2013

(65) Prior Publication Data

US 2013/0341163 A1 Dec. 26, 2013

Related U.S. Application Data

(60) Provisional application No. 61/661,933, filed on Jun. 20, 2012.

(51) Int. Cl.
| | |
|---|---|
| *B65G 15/36* | (2006.01) |
| *B65G 17/08* | (2006.01) |
| *B65G 15/30* | (2006.01) |
| *B65G 21/22* | (2006.01) |
| *B65G 15/62* | (2006.01) |
| *B65G 15/64* | (2006.01) |

(52) U.S. Cl.
CPC .............. *B65G 15/30* (2013.01); *B65G 17/08* (2013.01); *B65G 21/22* (2013.01); *B65G 15/62* (2013.01); *B65G 15/64* (2013.01)
USPC .......... 198/844.1; 198/837; 198/850

(58) Field of Classification Search
USPC .............. 198/617, 833, 837, 844.1, 850, 851
See application file for complete search history.

(56) References Cited

U.S. PATENT DOCUMENTS

| | | | | |
|---|---|---|---|---|
| 3,853,016 | A * | 12/1974 | Lane et al. ..................... | 198/698 |
| 4,078,654 | A * | 3/1978 | Sarovich .................. | 198/867.14 |
| 4,241,875 | A * | 12/1980 | Vandenbrink ................ | 238/10 F |
| 4,776,454 | A * | 10/1988 | Momose ....................... | 198/853 |
| 4,946,731 | A * | 8/1990 | Dutt .............................. | 428/156 |
| 5,066,344 | A * | 11/1991 | Inami et al. .................. | 156/138 |
| 5,543,015 | A * | 8/1996 | Jermo ........................ | 162/358.4 |
| 5,626,723 | A * | 5/1997 | Schiel et al. ............... | 162/358.4 |
| 6,105,785 | A * | 8/2000 | Williams ..................... | 209/307 |
| 6,173,831 | B1 * | 1/2001 | Grabscheid et al. ....... | 198/844.1 |
| 6,425,164 | B2 * | 7/2002 | Stahlecker ...................... | 19/246 |
| 6,572,505 | B1 * | 6/2003 | Knutson ...................... | 474/260 |

(Continued)

FOREIGN PATENT DOCUMENTS

| | | |
|---|---|---|
| EP | 0117684 A1 | 9/1984 |
| EP | 0810168 A1 | 12/1997 |

(Continued)

OTHER PUBLICATIONS

International Search Report and Written Opinion of the International Searching Authority, PCT/US2013/045078, mailed Aug. 6, 2013, European Patent Office, Rijswijk, NL.

*Primary Examiner* — Douglas Hess
(74) *Attorney, Agent, or Firm* — James T. Cronvich

(57) ABSTRACT

A cleanable belt conveyor and a method for making a cleanable belt conveyor having an underside sculpted with concave indentations to match the shape and positions of the elongated support rails forming a carryway. The support rails may be circular in cross section, and the indentations may be complementary portions of circular cylinders to receive the rails along an extended contact area.

19 Claims, 3 Drawing Sheets

(56) References Cited

U.S. PATENT DOCUMENTS

| | | | |
|---|---|---|---|
| 7,124,879 B1 * | 10/2006 | Maguire | 198/690.2 |
| 7,267,223 B2 * | 9/2007 | Spoors | 198/860.1 |
| 7,641,045 B2 * | 1/2010 | Ishikawa et al. | 198/867.15 |
| 7,704,131 B1 * | 4/2010 | Malenke et al. | 452/46 |
| 7,758,294 B2 * | 7/2010 | Maguire | 414/725 |
| 7,850,562 B2 | 12/2010 | DeGroot | |
| 7,980,385 B2 | 7/2011 | Guernsey | |
| 8,167,118 B2 | 5/2012 | Fourney | |
| 8,286,786 B1 * | 10/2012 | Saxena | 198/844.1 |
| 8,464,862 B2 * | 6/2013 | Honeycutt et al. | 198/822 |
| 8,646,596 B2 * | 2/2014 | Andersen | 198/853 |
| 2006/0278500 A1 | 12/2006 | Guernsey | |
| 2007/0175737 A1 | 8/2007 | Honeycutt et al. | |
| 2008/0146391 A1 | 6/2008 | DeGroot | |
| 2011/0056807 A1 | 3/2011 | Fourney | |

FOREIGN PATENT DOCUMENTS

| | | |
|---|---|---|
| JP | 2003292275 A | 10/2003 |
| WO | 2007043865 A1 | 4/2007 |
| WO | 2007092928 A2 | 8/2007 |
| WO | 2010007320 A1 | 1/2010 |

* cited by examiner

CLEANABLE CONVEYOR BELT AND CARRYWAY

BACKGROUND

The invention relates generally to power-driven conveyors and more particularly to belt conveyors that are easy to clean.

In the meat, poultry, fruit, and vegetable industries, conveyor belts are used to transport food products. Most conveyor belts are supported along carryways atop flat-topped wearstrips. Flat bottom surfaces on the belts riding along the flat-topped wearstrips provide sufficient contact area to spread the load and avoid high-pressure wear regions on the underside of the belt. But horizontal flat-topped support surfaces allow cleaning water to pool. Dirt and bacteria in the pooled water can contaminate the conveyed products. Crowned wearstrips prevent pooling of cleaning water, but contact the undersides of belts along a smaller high-pressure contact area, which results in increased wear of the belts and wearstrips.

Thus, there is a need for a cleanable, wear-resistant belt conveyor.

SUMMARY

This need and other needs are addressed by a conveyor embodying features of the invention. One version of such a conveyor comprises a carryway supporting a conveyor belt on support rails. The carryway includes parallel elongated support rails that extend longitudinally to define the length of the carryway. The parallel support rails are spaced apart laterally and have convex upper surfaces. The conveyor belt has an outer conveying side and an opposite underside supported on the support rails. The underside includes concave indentations that are spaced apart laterally and aligned longitudinally in columns to receive the support rails in the carryway. The concave indentations are shaped to contact the convex upper surfaces of the support rails along a contact area.

In another aspect, a conveyor belt embodying features of the invention comprises an outer conveying side and an opposite underside. Concave indentations are spaced apart laterally across the underside. The concave indentations are aligned in longitudinal columns in a direction of belt travel and are shaped to contact complementarily shaped support rails received in the concave indentations.

In another aspect, a method for making a cleanable belt conveyor comprises: (a) constructing a carryway with a plurality of parallel elongated support rails that have convex upper surfaces; and (b) supporting a conveyor belt in the carryway on columns of concave indentations laterally spaced on the underside of the conveyor belt to mate with the convex upper surfaces of the support rails.

BRIEF DESCRIPTION OF THE DRAWINGS

These aspects and features of the invention are described in more detail in the following description, appended claims, and accompanying drawings, in which:

DETAILED DESCRIPTION

Figure 1:
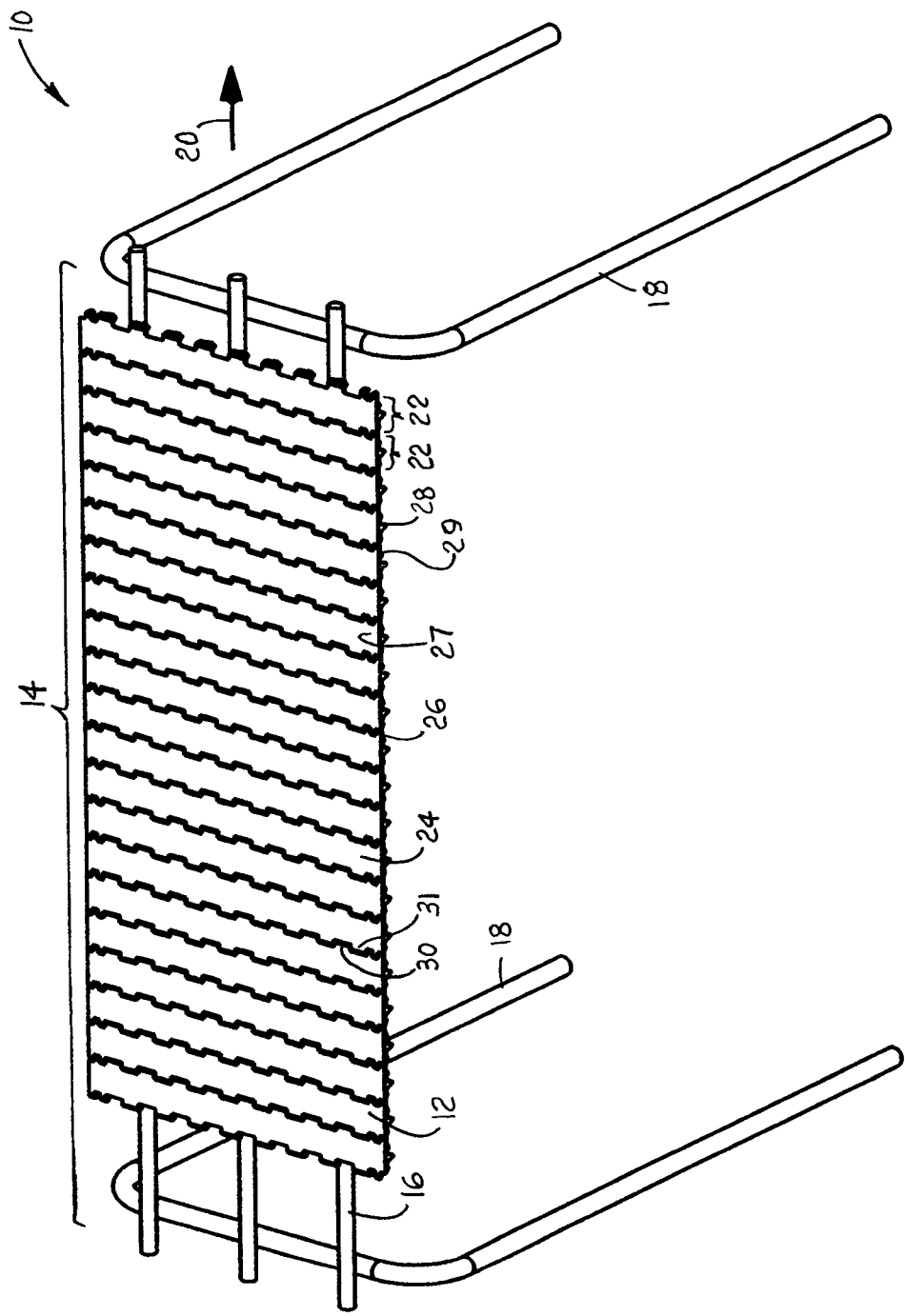
FIG. 1 is an oblique view of a portion of a conveyor belt and carryway embodying features of the invention.

A portion of a belt conveyor embodying features of the invention is shown in FIG. 1. The exemplary conveyor 10 comprises a conveyor belt 12 supported on a carryway 14 composed of parallel elongated support rails 16 supported on legs 18. In this example, three rails are shown. The length of the carryway is defined by the longitudinal extent of the support rails. The conveyor belt 12 shown in FIG. 1 is a modular plastic conveyor belt that is constructed of a series of rows 22 of belt modules 24 hingedly linked at hinge joints 26 between consecutive rows. In this example, each row comprises a single belt module. But the rows could include more than one module. Along the carryway, the belt forms a top carryway surface on an outer conveying side 27. Drive structure 28 formed on an opposite underside 29 of the belt engages drive faces on drive sprockets (not shown). The hinge joints are formed by interleaved leading and trailing hinge elements 30, 31 of consecutive rows. The hinge elements may include holes (32, FIGS. 2B and 3B) aligned laterally across the width of the conveyor belt 12 with the holes of interleaved hinge elements of a consecutive module to form a lateral passageway for one or more hinge rods (not shown). Alternatively, some of the hinge elements may include laterally extending stubs serving as hinge rods that are received in laterally opening recesses in adjacent interleaved hinge elements to form the hinge joints. The modular plastic conveyor belt 12 shown in FIG. 1 is made of a thermoplastic polymer, such as polypropylene, polyethylene, acetal, nylon, or a composite polymer, in an injection-molding process. But other kinds of belts, such as flat belts, may be used in the conveyor.

The conveyor belt 12 may be conventionally trained around idle and motor-driven drive sprockets or drums (not shown) at each end of the carryway and returned along a returnway (not shown) below the carryway. The drive sprockets engage the drive structure 28 to positively drive the belt along the carryway in the direction of belt travel 20.

Figures 2A, 2B:
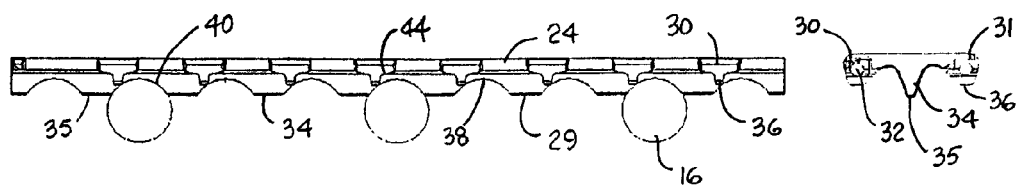
FIGS. 2A-2C are front elevation, side elevation, and bottom perspective views of one version of a conveyor belt module for a conveyor belt as in FIG. 1.
Figure 2C:
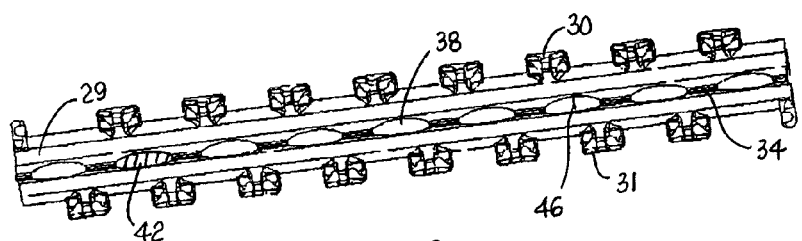

The conveyor belt module 24 and its engagement with the support rails 16 is shown in more detail in FIGS. 2A-2C. The module has drive structure on the underside 29 in the form of a drive bar 34 that extends laterally across the width of the module and the belt row. The bottom 35 of the drive bar 34 extends below the bottom surfaces 36 of the hinge elements 30, 31. The support rails 16 are shown with circular cross sections. The convex outer surfaces of the rails are more hygienic and easier to clean than the flat tops of conventional wearstrip supports. Sculpted into the drive bar 34 on the underside 29 of the module 24 are concave indentations 38 spaced apart laterally across the width of the module. When series of modules are linked together into a belt, the indentations are aligned in longitudinal columns. The concave indentations are shaped to match the convex shape of the upper surface 40 of the support rails 16. In this example, each indentation defines a portion of a circular cylinder that complements the circular cross section of the support rail over some or all of the lateral extents of the indentations and the upper surfaces of the support rails. In this example, the indentation contacts the support rails along a contact area 42 commensurate with at least a major portion of the indentation. (The contact area on the indentation is shown cross-hatched in FIG. 2C.) The contact area is much greater than for a module with a flat, unsculpted underside that would contact the circular support rail 16 only along its topmost tangent line. The greater contact area distributes the load, decreasing contact pressure and wear. Furthermore, the engagement of the indentations with the support rails provides tracking by preventing the belt from wandering laterally.

The hinge elements 30, 31 are laterally offset from each other and are also shaped along their outer bottom sides 44 to avoid contact with the support rails. Thus, in the example shown in FIGS. 2A-2C, the middles 46 of the indentations 38 are positioned midway between the middles of leading and trailing hinge elements 30, 31 of a module.

Figures 3A, 3B:
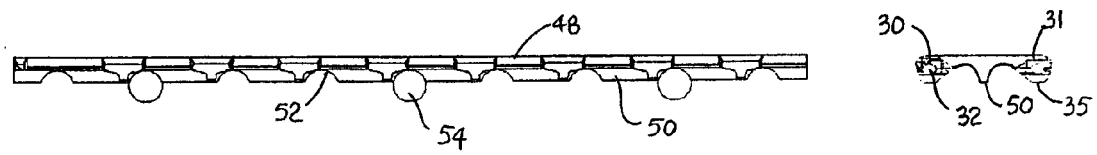
FIGS. 3A-3C are front elevation, side elevation, and perspective views of another version of a conveyor belt module for a conveyor belt as in FIG. 1.
Figure 3C:
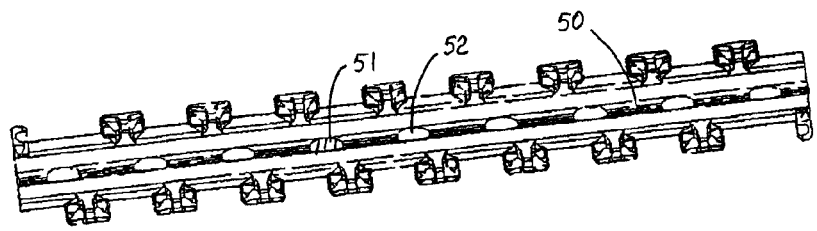

Another version of a belt module usable in a conveyor as in FIG. 1 is illustrated in FIGS. 3A-3C. The module 48 differs from the module 24 of FIGS. 2A-2C in that its drive bar 50 does not extend below the bottoms 35 of the hinge elements 30, 31. Because of the shallower drive bar 50 with the same hinge-element dimensions and spacings as in FIGS. 2A-2C, the contact areas 51 provided by the smaller indentations 52 are smaller than those in FIG. 2C. Furthermore, the support rails 54 are smaller in diameter than the support rails 16 in FIG. 2A to avoid the hinge elements. Otherwise, the concave indentations and the convex top surfaces of the support rails are complementarily shaped—in this example, arcuately shaped—so that the contact area between them is increased and wear is reduced.

Figure 4:
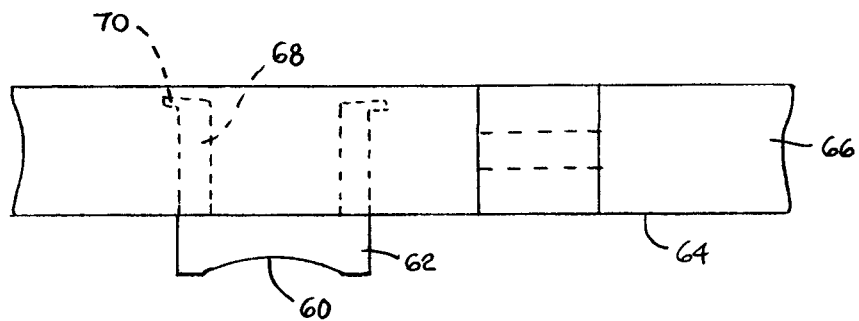
FIG. 4 is a front elevation view of a third version of a conveyor belt module for a conveyor belt usable on a carryway as in FIG. 1.

As shown in FIG. 4, a concave indentation 60 may be formed on an attachment 62 depending below the underside 64 of a belt module 66. The attachment 62 may be made of the same material as the module 66, but could be made of a more durable or lower-friction material for a longer wear life. If the attachment does wear, it can be replaced without the need to replace the entire module. The attachment 62 shown in FIG. 4 has two arms 68 that extend through the module and terminate in tabs 70 that engage structure in the module that retains the attachment in place. But the attachment and the module may be designed with other means for removably fastening the attachment. Instead of a removable attachment, the underside portions of the module could be formed with a more wear-resistant material overmolded onto or co-molded with the rest of the module.

Figure 5:
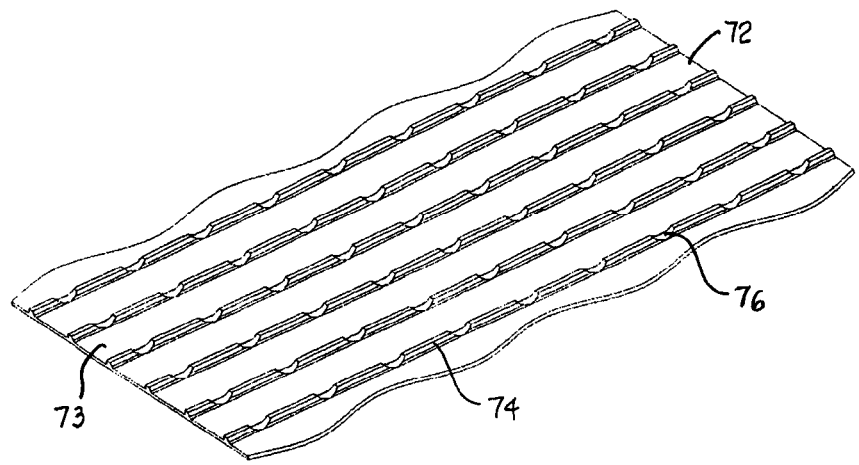
FIG. 5 is an isometric view of a portion of the underside of another version of a conveyor belt usable with support rails as in FIG. 1.
Figure 6:
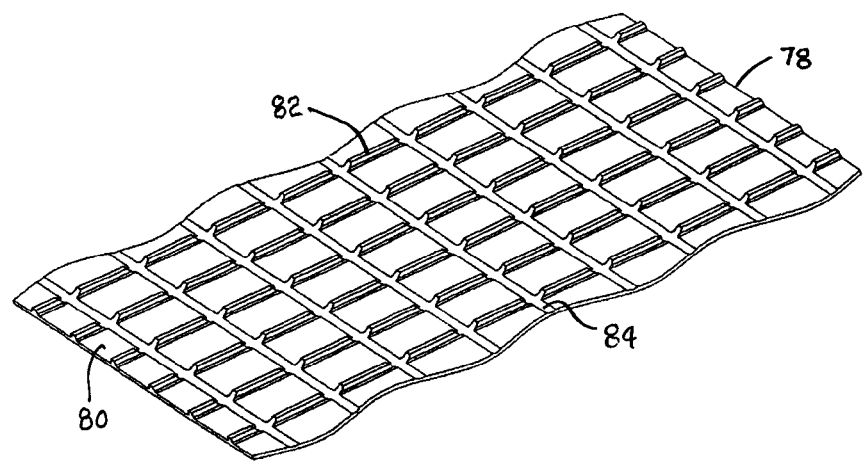
FIG. 6 is an isometric view of a portion of the underside of a conveyor belt as in FIG. 5, but with deeper concave indentations.

FIGS. 5 and 6 show other versions of conveyor belts usable with the convex carryways shown in FIGS. 1-3. The length portion of the conveyor belt 72 in FIG. 5 has as an underside 73 with drive bars 74 extending laterally across the width of the belt and regularly spaced along its length. To accommodate convex carryway support rails as in FIG. 1, the underside 73 is sculpted with concave indentations 76 from drive bar to drive bar arranged in longitudinal columns extending along the length of the belt to receive longitudinally extending complementary support rails. The conveyor belt 78 in FIG. 6 has an underside 80 sculpted with a drive bar 82 and laterally spaced concave indentations 84 that are deeper than the height of the drive bar and extend into the thickness of the flat belt mat to form longitudinal columns of concave indentations for receiving convex support rails. The belts shown in FIGS. 5 and 6 could be positively driven, low-tension conveyor belts or timing belts, as two examples.

Although the invention has been described with reference to specific versions, other versions are possible. For example, the support rails do not have to be circular over 360° in cross section: a semicircular cross section with the flat side down could be used. And other non-circular convex support rails could be used with non-circular mating concave indentations. As another example, belts without drive bars could be used. In that case, the indentations would be formed in other underside belt structure. So, as these few examples suggest, the scope of the invention is not meant to be limited to the exemplary versions described in detailed.

What is claimed is:

1. A conveyor comprising:
a carryway including a plurality of parallel elongated support rails extending longitudinally to define the length of the carryway and spaced apart laterally and having convex upper surfaces;
a conveyor belt including:
an outer conveying side and opposite underside supported in the carryway on the support rails,
wherein the underside has a plurality of concave indentations spaced apart laterally and aligned longitudinally in columns to receive the support rails in the carryway,
wherein the concave indentations are shaped to contact the convex upper surfaces of the support rails along a contact area.

2. A conveyor as in claim 1 wherein the contact area of the concave indentations and the support rails is arcuate.

3. A conveyor as in claim 1 wherein the support rails are circular in cross section and the concave indentations define a portion of a circular cylinder.

4. A conveyor as in claim 1 wherein the underside of the conveyor belt includes a plurality of drive bars extending laterally across the conveyor belt and wherein the concave indentations are formed in the drive bars.

5. A conveyor as in claim 1 wherein the conveyor belt includes a plurality of rows of belt modules hingedly linked together end to end at hinge joints between adjacent rows.

6. A conveyor as in claim 1 wherein the conveyor belt includes attachments fastened to the underside of the conveyor belt, wherein the concave indentations are formed on the attachments.

7. A conveyor belt comprising:
an outer conveying side and an opposite underside;
a plurality of unblocked concave indentations spaced apart laterally across the underside;
wherein the unblocked concave indentations are arranged in longitudinal columns in a direction of belt travel and shaped to contact complementarily shaped stationary support rails along which the conveyor belt advances with the support rails slidingly received in the unblocked concave indentations.

8. A conveyor belt as in claim 7 wherein the concave indentations are arcuate.

9. A conveyor belt as in claim 7 wherein the concave indentations define a portion of a circular cylinder.

10. A conveyor belt as in claim 7 wherein the portion of the support rails in contact with the indentations is convex.

11. A conveyor belt as in claim 7 comprising attachments fastened to the underside of the conveyor belt, wherein the concave indentations are formed on the attachments.

12. A conveyor belt as in claim 7 comprising:
a series of rows of belt modules hingedly linked together end to end at hinge joints between adjacent rows.

13. A conveyor belt as in claim 12 wherein the undersides of the belt modules are made of a more wear-resistant material than the material composing the other portions of the belt modules.

14. A conveyor belt as in claim 7 wherein the underside of each of the rows of belt module includes a drive bar extending laterally across the row and wherein the concave indentations are formed in the drive bar.

15. A method for making a cleanable belt conveyor comprising:
- constructing a carryway with a plurality of parallel, elongated support rails having convex upper surfaces;
- supporting a conveyor belt in the carryway on columns of concave indentations laterally spaced apart on the underside of the conveyor belt to mate with the convex upper surfaces of the support rails.

16. The method of claim 15 wherein the concave indentations and the contact areas of the support rails are both arcuate.

17. The method of claim 15 wherein the support rails are circular in cross section and the concave indentations are portions of a circular cylinder.

18. The method of claim 15 wherein the concave indentations and the support rails are complementarily shaped.

19. The method of claim 15 wherein the concave indentations are formed on attachments fastened to the conveyor belt.

\* \* \* \* \*